United States Patent [19]

Suozzo

[11] 3,809,186

[45] May 7, 1974

[54] MECHANICAL SHOCK AND SWAY ARRESTOR

[76] Inventor: Leonard S. Suozzo, 366 Maple Hill Dr., Hackensack, N.J. 07601

[22] Filed: Dec. 14, 1971

[21] Appl. No.: 207,838

[52] U.S. Cl. .............................. 188/1 B, 188/129
[51] Int. Cl. ............................................. F16f 7/10
[58] Field of Search ............ 188/1 R, 1 B, 2 R, 129, 188/130

[56] References Cited
UNITED STATES PATENTS

| | | | |
|---|---|---|---|
| 2,471,857 | 5/1949 | Bleakney et al. | 188/1 B |
| 3,059,727 | 10/1962 | Fuchs | 188/1 B |
| 3,532,187 | 10/1970 | Herring | 188/2 R |

Primary Examiner—Duane A. Reger
Attorney, Agent, or Firm—F. J. Pisarra

[57] ABSTRACT

A mechanical arrestor for protecting equipment, such as high temperature piping, vessels, or the like, against shock loading or undesirable vibratory movement while permitting requisite movement of the equipment due to normal changes in temperature or thermal movement of the equipment. The arrestor includes a housing which is anchored at one end to a stationary structure; a screw member which is anchored to the equipment and which extends through the other end of the housing and terminates in the housing; a nut member within the housing and engaging the screw member; and a spring device which is also within the housing and which is connected to the nut unit. The spring device is rotatable with the nut member about the axis of the screw member and is slidable relative to the nut member. The parts are so constructed and arranged as to automatically adjust the effective length of the arrestor in response to normal changes in temperature or thermal movement of the equipment and to convert the arrestor into a rigid strut in the event the equipment is subjected to shock loading or the like.

6 Claims, 7 Drawing Figures

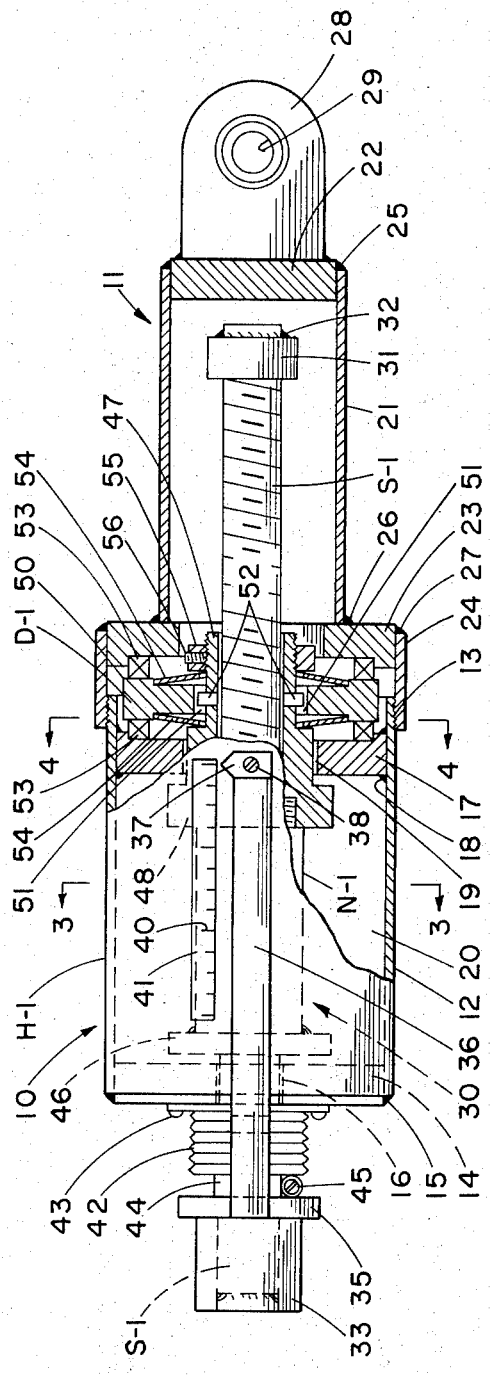
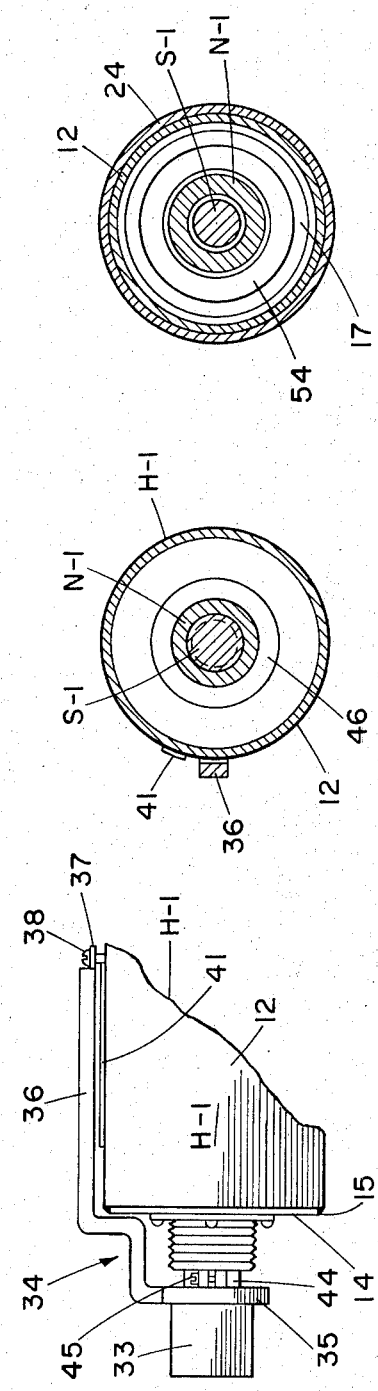

MECHANICAL SHOCK AND SWAY ARRESTOR

BACKGROUND OF THE INVENTION

This invention relates to the art of shock and sway arrestors and, more particularly, to a completely mechanical device for protecting piping or other equipment which may be subjected to shock loading, swaying, vibratory movement or other similar undesirable conditions during normal use.

The term "piping", as used in this description and in the claims, includes without limitation, high temperature piping, steam boilers, high temperature vessels and the like.

The shock and sway arrestor of this invention (hereinafter also referred to by the shortened designation "arrestor") constitutes, in effect, a device which is so constructed and arranged as to accommodate normal thermal movement of piping. To this end, the arrestor permits the piping to move freely and unrestrictedly through its normal operating range. However, and in the event the piping is subjected to a sudden shock or other displacement force, the arrestor becomes a rigid strut or snubber and transfers such force to a stationary structure, such as a building, at the instant the shock force occurs.

The arrestor of this invention has numerous uses including, for example, arresting movement of piping against undesirable sway and vibration forces, such as those caused by earthquakes; preventing possible damage to outdoor piping installations due to wind conditions; and protecting piping from damage from shock loading, such as those created by quick closing valves, water hammer, relief valve reaction or other possible causes.

There have been a number of developments in recent years in the field of shock and sway arrestors. Such arrestors include a category employing a hydraulic unit and intended for use with piping. While hydraulic arrestors represent advances in the art and are satisfactory for use in open and readily accessible locales, they are not acceptable for use in locations that are difficult or virtually impossible of access after installation. The reason for this is that the hydraulic unit, due to unavoidable leakage of its hydraulic fluid, requires periodic replenishment of such fluid.

The arrestor of this invention is free of the objections to hydraulic arrestors as it is completely mechanical. Moreover, the present arrestor does not require servicing or maintenance in use, and, for this reason, may be advantageously employed in locations that are normally inaccessible following installation.

There also have been several known developments in the art of shock and sway arrestors which do not employ hydraulic units and which are commonly referred to as "mechanical arrestors". Arrestors in this category are exemplified by those disclosed in several of my pending patent applications, namely, Ser. No. 79,559, filed Oct. 9, 1970, now U.S. Pat. No. 3,637,173 and Ser. No. 80,659, filed Oct. 14, 1970 now U.S. Pat. No. 3,669,391. While the arrestors of those applications represent worthwhile advances in the art, my present invention constitutes an important further advance, as will be evident from the ensuing discussion and the detailed description.

SUMMARY OF THE INVENTION

The arrestor of this invention, as indicated earlier herein, is intended for use with piping and a stationary structure to protect the piping against shock loading, undesirable vibratory movement or the like and to permit normal movement of the piping due to changes in its thermal condition. The arrestor includes a housing having a first end wall which is adapted to be anchored to the piping and a second end wall that is spaced from the first end wall and is provided with a through opening. A screw member extends through said opening and projects into and terminates in the housing. The outer end of the screw member is adapted to be anchored to the stationary structure. A nut member is located within the housing and is threadedly connected to the screw member. A first means within the housing engages the nut member and permits rotary movement but prevents axial movement of the nut member in response to corresponding axial movement of the screw member relative to the housing due to thermal movement of the piping. A second means also within the housing is engageable by the first means upon axial movement of the screw member in response to the piping being subjected to shock loading, vibratory movement or the like, to prevent any movement of the nut member relative to the screw member and convert and maintain the arrestor into and as a rigid strut so long as the shock loading, vibratory movement or the like, persists.

The principal object of this invention is to provide a completely mechanical arrestor which permits normal movement of piping but, in the event the piping is subjected to a shock or other abnormal displacement force, serves as a rigid strut at the instant the shock force occurs.

Another object of the invention is to provide a shock and sway arrestor which may be advantageously employed in locations that are difficult or virtually impossible of access after installation has been completed.

The invention has for a further object the provision of an arrestor of the character indicated that is simple and compact in design; that is sturdy and durable in construction; that is reasonable in manufacturing and installation costs; that does not require servicing or maintenance; and that is capable of rendering efficient and dependable service over extended time periods.

The enumerated objects and additional objects, together with the advantages of the invention, will be readily apparent to persons trained in the art from the following detailed description and the accompanying drawings which respectively describe and illustrate several embodiments of arrestors constructed in accordance with this invention.

BRIEF DESCRIPTION OF THE DRAWINGS

In the drawings, wherein like reference characters denote corresponding parts in the several views:

FIG. 1 is a view partly in front elevation and partly in central vertical cross section of a first form of arrestor of this invention;

FIG. 2 is a bottom plan view, on a reduced scale, of the left portion of the arrestor shown in FIG. 1;

FIG. 3 is a cross sectional view, on a reduced scale, taken along line 3—3 of FIG. 1;

FIG. 4 is a cross sectional view, on a reduced scale, taken along line 4—4 of FIG. 1;

DESCRIPTION OF THE PREFERRED EMBODIMENTS

Figure 5:
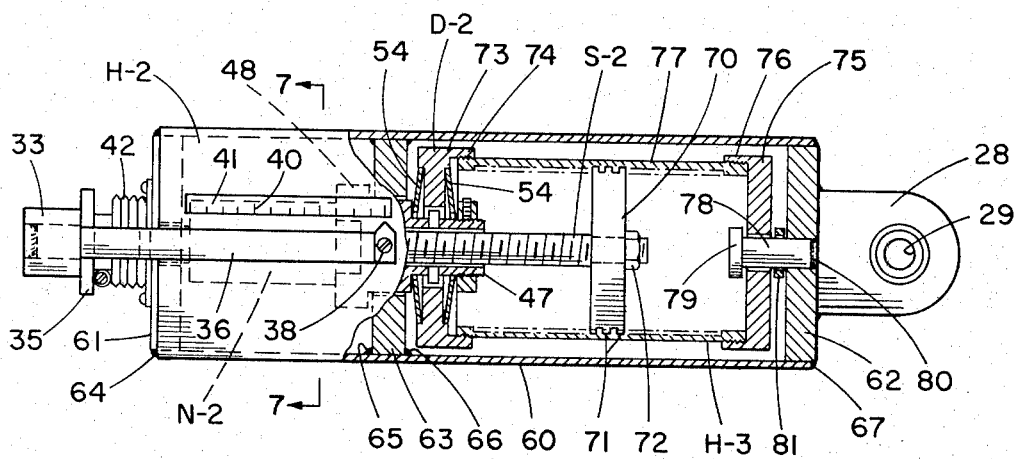
FIG. 5 is a view partly in front elevation and partly in central vertical cross section of a second form of arrestor of this invention.

Referring initially to FIG. 1 of the drawings, the therein illustrated arrestor of this invention comprises a housing H-1, a screw member S-1, a nut member N-1 and spring device D-1.

Housing H-1 consists of a body unit 10 and a cover unit 11. Body unit 10 includes a right circular cylindrical wall 12 which is externally threaded at one end, as indicated at 13; an end wall 14 which is secured to the other end of wall 12 by welding, as indicated at 15, and which is provided with a central through opening 16; and a circular partition 17 which is spaced from and parallel to end wall 14 and is welded to wall 12, as indicated at 18. The partition is formed with a central through opening 19. The portion of the interior of body unit 10 between end wall 14 and partition 17 constitutes a compartment 20.

Cover unit 11 includes an elongated tubular wall 21, an end wall 22, a ring plate 23 and a relatively short tubular wall 24 which is internally threaded at its free end for engagement with the threads 13 of wall 12. The enumerated parts of the cover unit are arranged, as illustrated, and joined by weldments 25, 26 and 27 to obtain a sturdy unitary structure. Secured to end wall 22, preferably by welding, is an ear 28 having an opening 29 for connection to a stationary structure (not shown) or to piping (also not shown).

Screw member S-1 and nut member N-1 are elements of a mechanism 30 which serves the functions of converting rectilinear movement of the screw member into rotary movement of the nut member during normal use conditions of the arrestor and converting the arrestor into a rigid strut under abnormal use conditions, such as when the piping is subjected to shock loading, as will be explained in detail further along herein. Mechanism 30 is a low friction ball screw and nut assembly and is preferably of a type manufactured by Beaver Precision Products, Inc. of Troy, Michigan.

Screw member S-1 extends through openings 16 and 19 of body unit 10 and terminates in tubular member 21 of cover unit 11. An internally threaded ring 31 is carried at the inner end of the screw member and is welded thereto, as indicated at 32. Secured to the outer end of the screw member is a sleeve 33 which is adapted to be connected to a stationary structure (not shown) or to piping (also not shown). It is recommended that the sleeve 33 be connected to a stationary support and that ear 28 be connected to the piping, in use. Alternatively, sleeve 33 may be connected to the piping and ear 28 connected to the stationary support, if desired.

A travel indicator 34, which is best shown in FIGS. 1 and 2, is positioned adjacent sleeve 33. The travel indicator includes a ring element 35 through which the outer end of the screw member passes, and an integral arm 36 which overlies body unit wall 12 and is parallel to the axis of the screw member. A pointer 37 is secured to the free end of arm 36 and cooperates with graduations 40 on a plate 41 for indicating the axial position of the screw member relative to the housing. Plate 41 is attached to wall 12 of the body unit in any desired manner known to the art. A preset screw 38 engages a tap in pointer 37 and is adapted to project into an opening (not shown) in wall 12. Screw 38 is disengaged from the housing at the time the arrestor is placed in active service.

Interposed between ring element 35 of the travel indicator and wall 14 of housing H-1 is a bellows 42 which is coaxial with the screw member S-1. The bellows is affixed to housing wall 14 by screws or the like 43 and to the screw member, immediately adjacent ring element 35, by means of a split clamping ring 44 and a screw 45. The bellows protects the threads of the screw member and the parts within the housing against foreign air-born particles, such as dust and dirt.

Nut member N-1 and screw member S-1 are threaded oppositely. The nut member is provided with a coaxial stop ring 46 at one end and an also coaxial tubular member 47 at its other end. The tubular member is formed with an annular flange 48 and is externally threaded at its free end. A ring member 50 is carried by tubular member 47 and is provided with a pair of oppositely formed internal slots 51. A pair of diametrically arranged pins 52 is carried by the tubular member. Each pin projects into a corresponding slot 51 whereby to prevent rotary movement and permit axial movement of tubular member 47 relative to ring member 50. The arrestor is equipped with a pair of thrust bearings 53. As illustrated, one of the thrust bearings is positioned between ring member 50 and partition 17 and the other is positioned between ring member 50 and element 23 of cover unit 11.

Spring device D-1 is comprised of referred-to ring member 50 and other parts which will now be identified. Such parts include a pair of disc springs 54 which are disposed to opposite sides of ring member 50. A ring nut 55 engages the threaded end of tubular member 47. It will be evident from an examination of FIG. 1 that nut 55 is adapted to adjust the loading on the disc springs. The nut is maintained in selected adjusted position by a set screw 56.

For the purpose of describing the operation of the arrestor shown in FIGS. 1 – 4, it is first assumed that the arrestor is connected to a stationary structure, such as a building wall (not shown), by way of sleeve 33 and to piping (not shown), by way of ear 28. It is also assumed that preset screw 38 has been disengaged from the housing H-1 and that the arrestor has been extended so that pointer 37 indicates a travel position intermediate the ends of plate 41.

It will be appreciated from an examination of FIG. 1 that the arrestor permits normal movement of the piping relative to the stationary structure but serves as a rigid strut in the event the piping is subjected to a sudden shock force. If, for example, the piping moves normally, due to temperature conditions, to the right, the parts are so arranged that the effective length of the arrestor is correspondingly increased. In like manner, if the piping moves normally, due to temperature conditions, to the left, the effective length of the arrestor is correspondingly decreased. In either case, screw member S-1 moves axially and nut member N-1 remains in the axial position shown in FIG. 1.

In the event that the piping is subjected to a shock force or the like, resulting axial movement of screw member S-1 relative to the housing will cause corresponding axial movement of nut member N-1 whereby its stop ring 46 will bear against housing wall 14, which serves as a stop member, or flange 48 will bear against partition 17, which also serves as a stop member depending on the direction of axial movement of screw member S-1. This converts the arrestor into a rigid strut. Simultaneously, disc springs 54 will be further compressed and will exert a minor force opposite in direction to that of the shock force acting on the arrestor. When the shock force is relieved, the spring device automatically urges nut member N-1 in a release direction and allows the nut member and spring device D-1 to return to their illustrated normal position within housing body 10.

Figure 6:
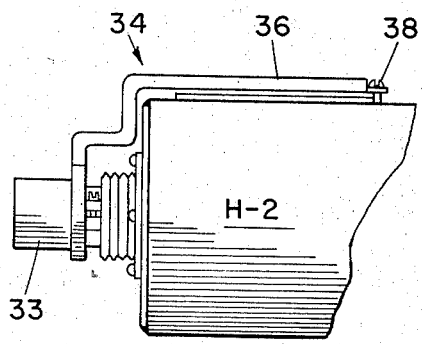
FIG. 6 is a bottom plan view of the left portion of the arrestor shown in FIG. 5.
Figure 7:
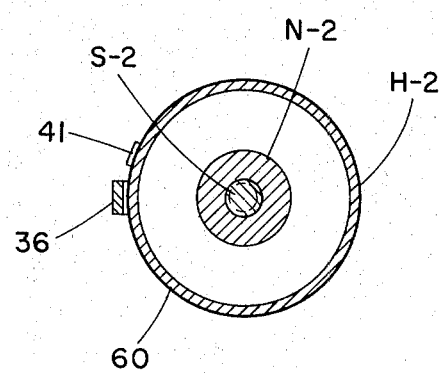
FIG. 7 is a cross sectional view taken along line 7—7 of FIG. 5.

Referring next to FIGS. 5, 6 and 7, the therein illustrated form of arrestor of this invention is, in many respects, the same as or similar to the arrestor of FIGS. 1 - 4 and comprises a housing H-2, a screw member S-2, a nut member N-2 and a spring device D-2.

Housing H-2 consists of a circular tubular wall 60, a pair of end walls 61 and 62 and a partition 63, corresponding to partition 17 of FIG. 1 and positioned intermediate the end walls. The referred-to-parts of the housing are joined by weldments 64, 65, 66 and 67 to obtain a sturdy, rigid, unitary structure.

Screw member S-2 is similar to earlier described screw member S-1 and functions in essentially the same manner as screw member S-1. A ring type screw 70 is carried at the inner end of screw member S-2 and is provided with square external threads 71. Ring screw 70 is secured to the screw member by a nut 72 and is rotatable with the screw member.

Device D-2 includes a number of parts which are the same as corresponding parts of device D-1. This device includes a first ring member 73 which is similar to ring member 50 and which is provided with an integral internally threaded annular flange 74. A second ring member 75 is spaced from and coaxial with first member 73 and has an internally threaded annular flange 76. A circular tubular member 77 is externally threaded at its ends for threaded connection to flange 74 of ring member 73 and to flange 76 of ring member 75. Tubular member 77 is threaded internally for mating engagement with the threads 71 of ring screw 70. Ring members 73 and 75 and tubular member 77 constitute elements of an internal housing H-3.

A cylindrical post 78 having a head 79 extends through the central opening defined by ring member 75 and registers with an opening in end wall 62 of housing H-2. Post 78 is welded to wall 62, as indicated at 80. A spacer ring 81 is interposed between ring member 75 and wall 62.

As in the case of the arrestor of FIGS. 1 - 4, the arrestor of FIGS. 5 - 7 permits normal movement of equipment, such as piping, relative to a stationary structure, due to changes in temperature conditions, but serves as a rigid strut in the event the piping is subjected to a sudden shock force. This will be evident from an examination of FIG. 5. Also, as in the case of the first described arrestor, the effective length of the arrestor of FIGS. 5 - 7 is increased or decreased in response to normal movement of the piping and depending on the direction of such movement and screw S-2 moves axially and nut member N-2 and housing H-3 remain in the axial position shown in FIG. 5.

At such time as the piping is subjected to a shock force or the like, resulting axial movement of screw member S-2 relative to housing H-2 will cause corresponding axial movement of nut member N-2 and housing H-3 whereby flange 48 of tubular member 47 will bear against partition 63 or ring member 75 of housing H-3 will bear against head 79 of post 78 depending on the direction of axial movement of screw member S-2. This converts the arrestor into a rigid strut and disc springs 54 will function in the same manner as the like springs of FIG. 1.

Based on the foregoing, it is believed that the construction, operation, objects and advantages of my present invention will be readily comprehended by persons skilled in the art without further description. It is to be clearly understood, however, that various changes in the constructions described above and illustrated in the drawings may be made without departing from the scope of the invention, it being intended that all matter contained in the description or shown in the drawings shall be interpreted as illustrative only and not in a limiting sense.

I claim:

1. In combination: a stationary structural unit; a piping unit which is subject to thermal movement; and an arrestor for protecting the piping unit against shock loading, undesirable vibratory movement or the like; said arrestor comprising a housing including a first end wall which is connected to one of said units and a second end wall spaced from the first end wall and having a through opening; a screw member extending through said opening and projecting into and terminating in the housing, said screw member being connected to the other of said units; a nut member within the housing and threadedly engaging the screw member; first means within the housing and engaging the nut member to permit rotary movement and prevent axial movement of the nut member in response to axial movement of the screw member relative to the housing due to thermal movement of the piping unit, said first means comprising a ring member carried by and rotatable with the nut member, means preventing axial movement of the ring member, a tubular member carried by and rotatable with the nut member, said tubular member being slidable relative to the ring member, and resilient means yieldingly restraining the tubular member against sliding movement relative to the ring member; and second means responsive to the piping unit being subjected to shock loading, undesirable vibratory movement or the like to prevent any movement of the nut member relative to the screw member and convert and maintain the arrestor into and as a rigid strut so long as the shock loading, vibratory movement or the like persists, said second means comprising a pair of spaced stop members carried by the housing and a pair of spaced stop elements carried by the nut member, each stop element being adapted to engage a corresponding stop member.

2. The combination according to claim 1 further comprising adjusting means for varying the loading on the resilient means.

3. The combination according to claim 1 wherein the resilient means comprises a spring stressed in compression.

4. The combination according to claim 1 wherein the resilient means comprises a pair of oppositely acting disc springs that are coaxial with the nut member.

5. The combination according to claim 4 further comprising adjusting means for simultaneously varying the loading on both disc springs.

6. The combination according to claim 1 wherein at least one of the stop members comprises a partition within the housing and having an opening through which the screw extends.

* * * * *